O. A. STEMPEL.
PACKING EGGS FOR TRANSPORTATION.
No. 195,179. Patented Sept. 11, 1877.
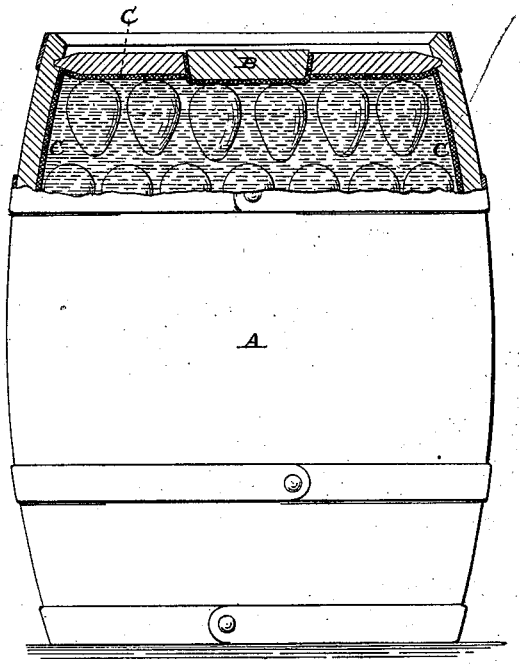
ATTEST:
Robert Burns,
Le Blond Burdett
INVENTOR:
Omar A. Stempel
per Knight Bros
attys.

UNITED STATES PATENT OFFICE.

OMAR A. STEMPEL, OF CHAMOIS, MISSOURI.

IMPROVEMENT IN PACKING EGGS FOR TRANSPORTATION.

Specification forming part of Letters Patent No. 195,179, dated September 11, 1877; application filed March 27, 1877.

*To all whom it may concern:*

Be it known that I, OMAR A. STEMPEL, of Chamois, in the county of Osage and State of Missouri, have invented a certain Improved Method of Packing Eggs for Transportation, of which the following is a full, clear, and exact description, reference being had to the accompanying drawings.

My improvement consists in lining the inside of a water-tight vessel, and packing eggs therein in a solution of salt and lime having the same specific gravity as the eggs.

The drawing is an axial section of a lined barrel packed with eggs in this manner.

The barrel A may be of any usual and convenient form and size, or any other water-tight vessel may be used. Its whole interior surface is lined with some kind of cloth or felt. I have used coffee-bagging for this lining $c$, and have found it well adapted to the purpose, besides being cheap. Gunny-bagging or other cheap or suitable material may be used. The head is provided with a hole, B, large enough to admit an egg, to allow the addition of the liquid or of eggs after the head is put in place in the barrel. The solution surrounds the eggs and fills the whole interior of the barrel except that space occupied by the eggs.

The above solution is made as follows: To each five gallons of water I add one quart of fresh slaked lime and one quart of common salt. These are well mixed.

It will be understood that, as the solution has the same specific gravity as the eggs, the eggs will be perfectly cushioned in the barrel, and that any violent concussion will not be communicated to only a small part of the egg-surface, as is the case where the egg is immersed in a lighter medium, such as air or even pure water.

The solution is not liable to freeze, and, even where the cold is so very severe as to freeze the eggs, the process of freezing and thawing would be so gradual as to prevent injury to the eggs; and as the solution is not liable to freeze, the barrel would not be liable to destruction from this cause.

The solution acts as a preservative, keeping the eggs fresh for a long time, and when taken from the solution the egg-shells have a fresh, clean look, which is not the case where the eggs are packed in clear water, as the eggs have sufficient dirt upon them to contaminate the water. Should a cracked egg be accidentally packed, the solution is not rendered foul thereby, but is preserved in a pure condition by the salt and lime.

The cushion-lining $c$ prevents the contact of the egg with the outer wall of the package, so that a sharp concussion cannot be communicated to the egg.

I am aware that water has been used for an egg-packing in transportation, and this I do not claim.

I am also aware that eggs have been packed down in a creamy solution of lime for preservation, and I do not claim this as of my invention; but

What I claim as my invention is—

1. The method of packing the eggs for transportation in a preservative liquid solution having a specific gravity about equal to that of the eggs, substantially as described.

2. The package for containing the eggs in their preservative liquid solution of the specific gravity described, consisting of a casing, A, having a lining, $c$, of cloth or other similar fabric, substantially as described.

OMAR A. STEMPEL.

Witnesses:
JNO. A. KNOTT,
C. P. THOMAS.